(12) United States Patent
Chou et al.

(10) Patent No.: US 8,564,570 B2
(45) Date of Patent: Oct. 22, 2013

(54) OPTICAL TOUCH APPARATUS AND OPERATING METHOD THEREOF

(75) Inventors: Chung-Cheng Chou, Luzhu Township, Taoyuan County (TW); William Wang, Taoyuan (TW); Meng-Shin Yen, Taipei (TW)

(73) Assignee: Raydium Semiconductor Corporation, Hsinchu (TW)

( * ) Notice: Subject to any disclaimer, the term of this patent is extended or adjusted under 35 U.S.C. 154(b) by 467 days.

(21) Appl. No.: 12/875,288

(22) Filed: Sep. 3, 2010

(65) Prior Publication Data
US 2011/0063254 A1 Mar. 17, 2011

(30) Foreign Application Priority Data

Sep. 11, 2009 (TW) .............................. 98130718 A

(51) Int. Cl.
*G06F 3/042* (2006.01)
*G06F 3/041* (2006.01)

(52) U.S. Cl.
USPC .......................................... 345/175; 345/173

(58) Field of Classification Search
USPC .................................... 345/175, 173
See application file for complete search history.

(56) References Cited

U.S. PATENT DOCUMENTS

2005/0128190 A1* 6/2005 Ryynanen ..................... 345/173

\* cited by examiner

*Primary Examiner* — Kent Chang
*Assistant Examiner* — Chayce Bibbee

(57) ABSTRACT

An optical touch apparatus including an input interface, at least one sensing module, and a processing module is disclosed. The input interface includes at least one functional input key, and the position of the at least one functional input key disposed on the input interface corresponds to that of the at least one sensing module disposed on the surrounding of the input interface. The at least one sensing module generates a sensing result according to the condition that the at least one sensing module receives sensing lights. The processing module determines touch point position formed on the input interface according to the sensing result.

14 Claims, 7 Drawing Sheets

OPTICAL TOUCH APPARATUS AND OPERATING METHOD THEREOF

BACKGROUND OF THE INVENTION

1. Field of the Invention

The invention relates to a touch apparatus. In particular, the present invention relates to an optical touch apparatus and operating method thereof capable of determining positions of multiple touch points at the same time by disposing a functional input key corresponding to the sensing module.

2. Description of the Prior Art

In general, common touch apparatus has many types including a resistance touch apparatus, a capacitance touch apparatus, and an optical touch apparatus. Wherein, since the optical touch apparatus has a characteristic of good light transmittance, the optical touch apparatus has become another common technology different from the conventional resistance touch apparatus and capacitance touch apparatus.

Please refer to FIG. 1. FIG. 1 illustrates a schematic diagram of a conventional optical touch apparatus. As shown in FIG. 1, the processing module 16 of the optical touch apparatus 1 can effectively reduce the huge data amount operated by the processing module 16 to determine the touch points by comparing the touch point P with the background space 18 to increase its touch point determining efficiency. However, in practical applications, the conventional optical touch apparatus 1 will still encounter the issue of how to determine touch point positions and multiple touch points at the same time.

For example, as shown in FIG. 2, the sensing module 12 of the optical touch apparatus 1 can sense the touch points located between the sensing area boundaries L1 and L2. Since the touch points C1 and C2 are located out of the sensible area, the sensing module 12 fails to sense the touch points C1 and C2. On the contrary, the touch points A1, A2, B1, and B2 located in the sensible area can be sensed by the sensing module 12. For the touch points located in the sensible area, when the touch points A1 and A2 are formed on the optical touch apparatus 1 at the same time, the sensing module 12 can effectively get the measurement result to determine the touch point location. However, when the touch points A1 and B1 (or A2 and B2) are formed on the optical touch apparatus 1 at the same time, since the location of the touch point B1 (or B2) will be blocked by the touch point A1 (or A2), the sensing module 12 cannot obtain complete touch point sensing result and fails to accurately determine the touch point location.

Therefore, the invention provides an optical touch apparatus and operating method thereof to solve the above-mentioned problems.

SUMMARY OF THE INVENTION

A first embodiment of the invention is an optical touch apparatus. In this embodiment, the optical touch apparatus includes an input interface, at least one sensing module, and a processing module. The input interface includes at least one functional input key, and the position of the at least one functional input key disposed on the input interface corresponds to the position of the at least one sensing module disposed around the input interface. The at least one sensing module receives sensing lights and generates a sensing result according to the condition of receiving the sensing lights. The processing module determines a touch point position formed on the input interface according to the sensing result.

A second embodiment of the invention is an optical touch apparatus operating method. In this embodiment, the optical touch apparatus includes an input interface, at least one sensing module, and a processing module. The method includes steps of: (a) disposing the at least one sensing module around the input interface; (b) disposing at least one functional input key on the input interface to make the position of the at least one functional input key disposed on the input interface corresponding to the position of the at least one sensing module disposed around the input interface; (c) the at least one sensing module generating a sensing result according to the condition of receiving the sensing lights; and (d) the processing module determining a touch point position formed on the input interface according to the sensing result.

The advantage and spirit of the invention may be understood by the following recitations together with the appended drawings.

BRIEF DESCRIPTION OF THE APPENDED DRAWINGS

Figure 4A:
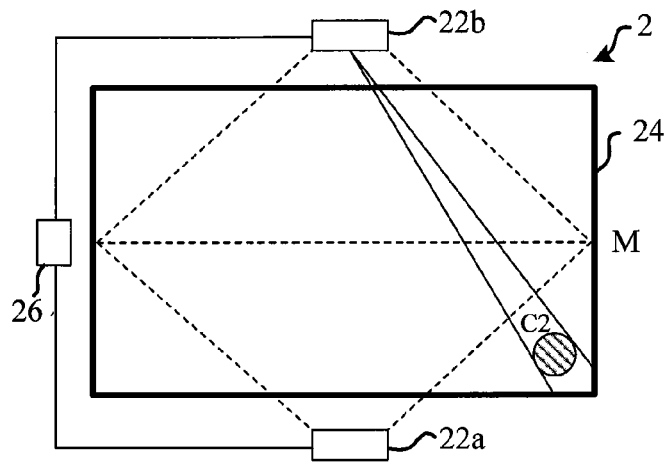
Figure 4B:
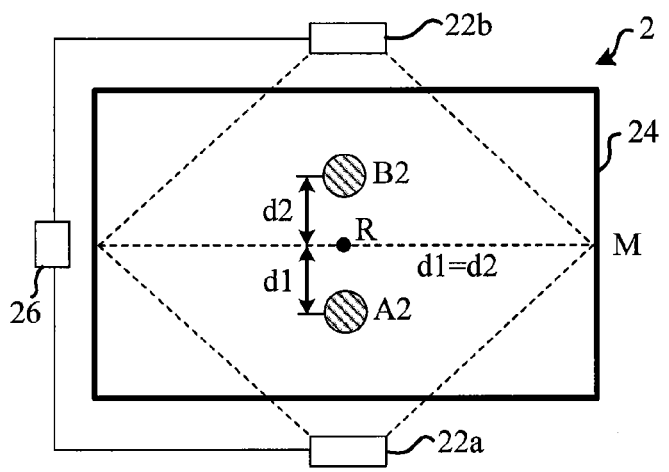
Figure 4C:
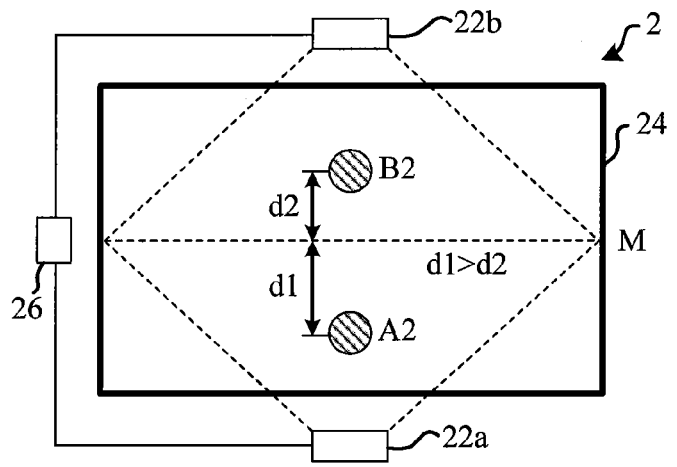

FIG. 4(B) and FIG. 4(C) illustrate the condition of the optical touch apparatus sensing two touch points formed on the input interface at the same time.

Figure 5A:
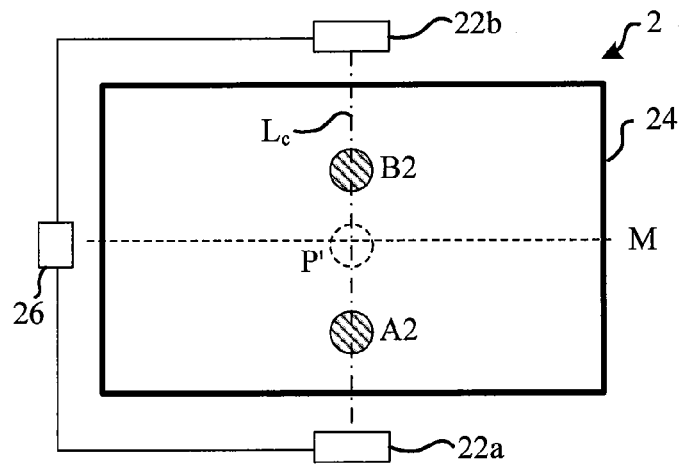
Figure 5B:
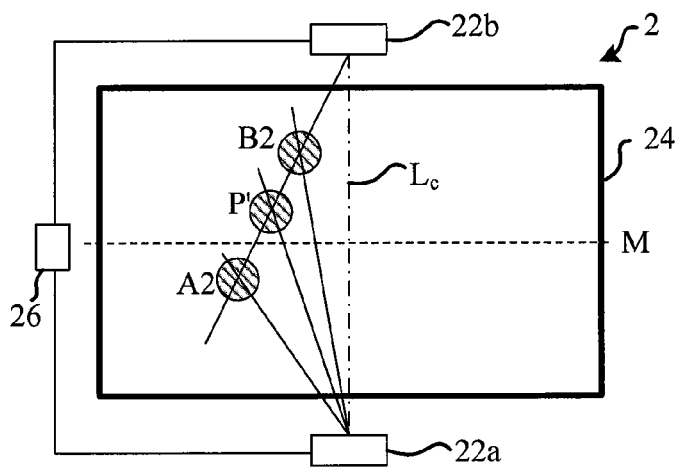
Figure 5C:
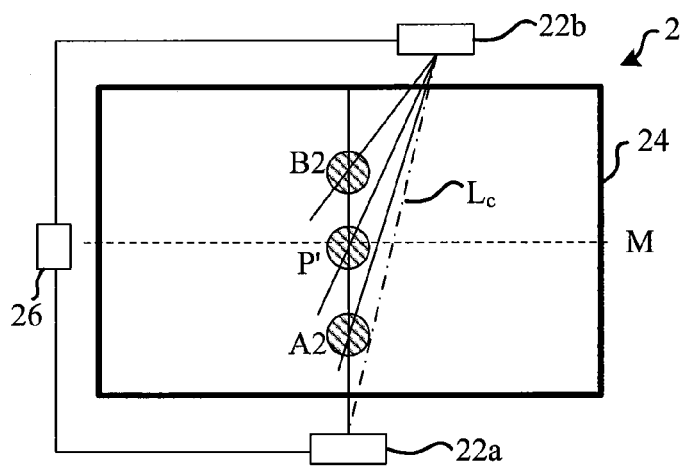

FIG. 5(A)~FIG. 5(C) illustrate different conditions of the optical touch apparatus sensing three touch points formed on the input interface at the same time respectively.

Figure 6A:
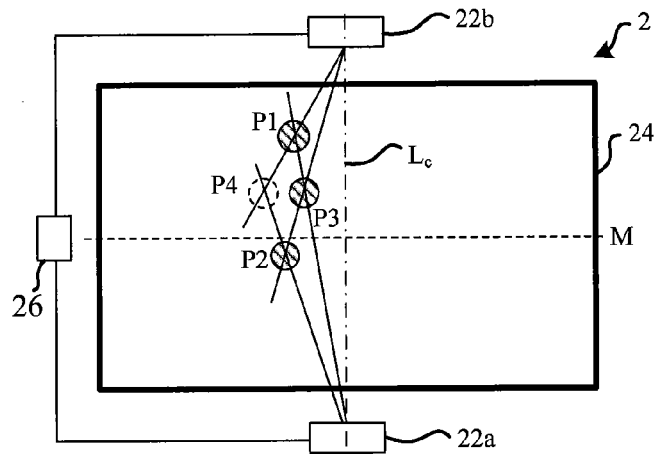
Figure 6B:
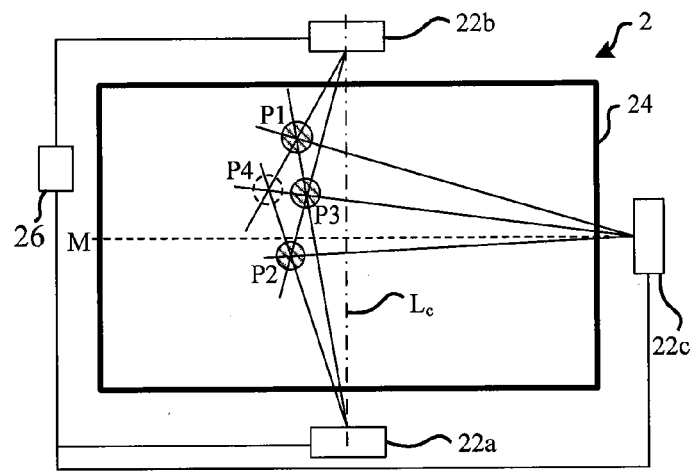

FIG. 6(A) and FIG. 6(B) illustrate the corresponding relationship between the number of touch points at the same time and the number of sensing modules.

Figures 7A, 7B:
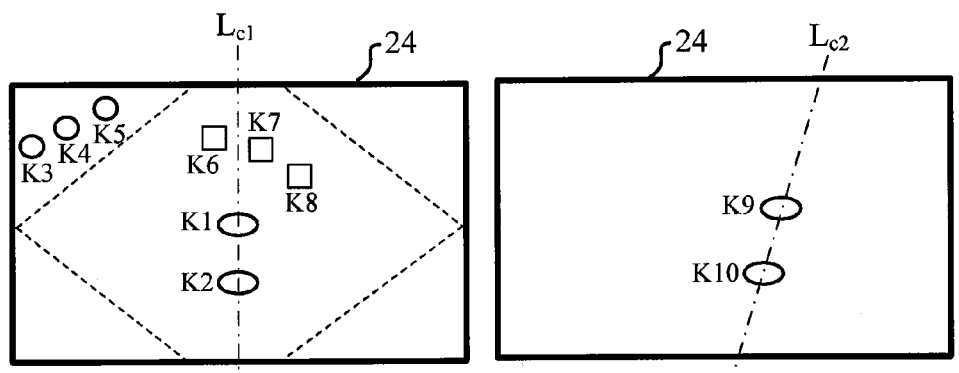

FIG. 7(A) and FIG. 7(B) illustrate different examples of disposing the functional input key on the input interface.

FIG. 8(A)~FIG. 8(D) illustrate an example of using the functional input key to perform the diagram editing function.

FIG. 9(A)~FIG. 9(E) illustrate another example of using the functional input key to perform the diagram editing function.

Figure 10:
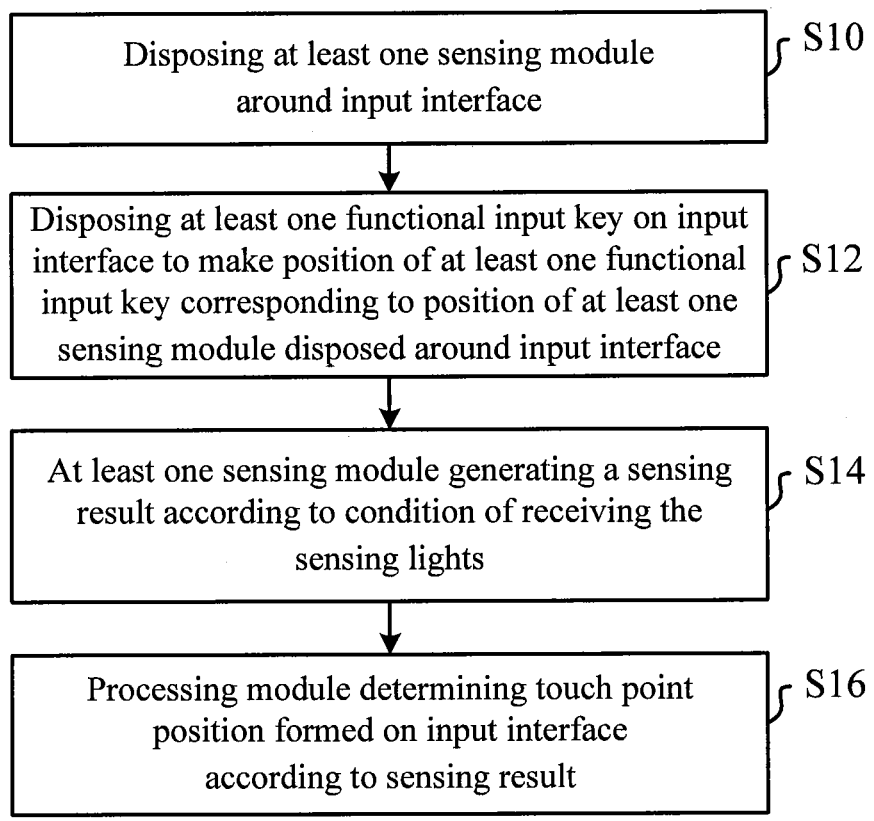

FIG. 10 illustrates a flowchart of the optical touch apparatus operating method of the second embodiment in the invention.

DETAILED DESCRIPTION OF THE INVENTION

Figure 3:
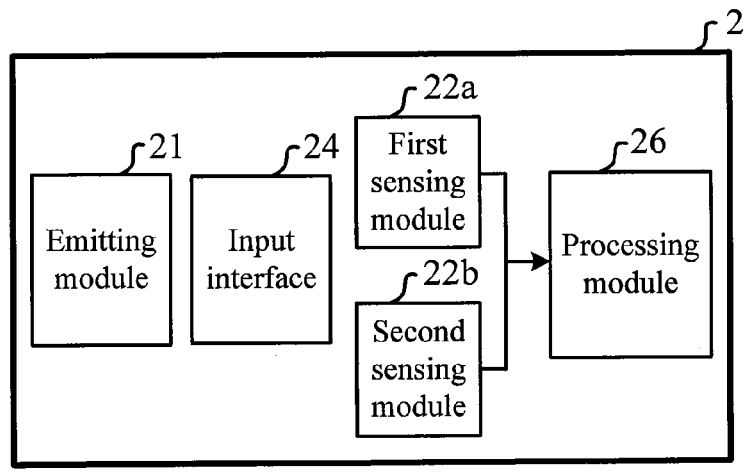
FIG. 3 and FIG. 4(A) illustrate a functional block diagram and a schematic diagram of the optical touch apparatus of the first embodiment in the invention respectively.

A first embodiment of the invention is an optical touch apparatus. In this embodiment, the optical touch apparatus can be applied to a LCD apparatus or other display apparatus, and has both of the image displaying function and the touch inputting function, but the invention is not limited by this case. Please refer to FIG. 3 and FIG. 4(A). FIG. 3 and FIG. 4(A) illustrate a functional block diagram and a schematic diagram of the optical touch apparatus respectively.

As shown in FIG. 3 and FIG. 4(A), the optical touch apparatus 2 includes an emitting module 21, a first sensing module 22a, a second sensing module 22b, an input interface 24, and a processing module 26. Wherein, the first sensing module 22a and the second sensing module 22b are coupled to the processing module 26; the first sensing module 22a and the second sensing module 22b are oppositely disposed at an upper side and a lower side of the input interface 24, but not limited by this case. It should be noticed that the number of the sensing modules in the optical touch apparatus 2 has no limitations, and it depends on the practical needs, and it is not limited by two in this embodiment.

In this embodiment, the emitting module 21 is used to emit a sensing light to be the light source for sensing touch points.

The type, number, and location of the light source of the emitting module 21 have no limitations and depend on practical needs. In addition, the first sensing module 22a and the second sensing module 22b are disposed around the input interface 24, and used for receiving sensing lights passing above the input interface 24, and generating a first sensing result and a second sensing result according to the condition of receiving the sensing lights respectively. The processing module 26 determines touch point positions formed on the input interface 24 according to the first sensing result and the second sensing result.

Figure 1:
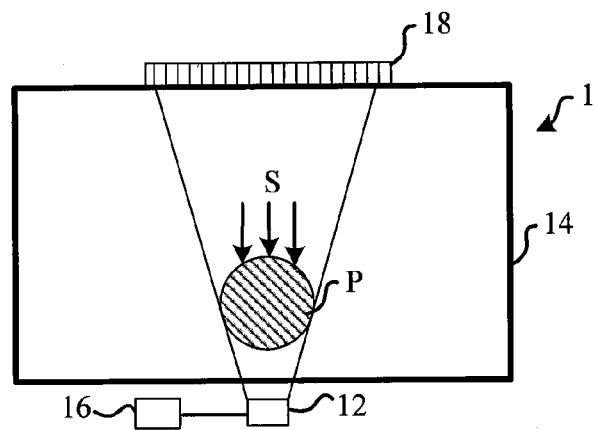
FIG. 1 and FIG. 2 illustrate schematic diagrams of the conventional optical touch apparatus.
Figure 2:
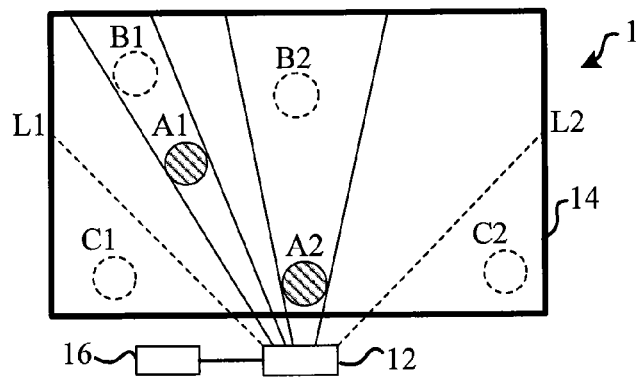

As shown in FIG. 4(A), the touch point C2 which cannot be sensed by the optical touch apparatus 1 in FIG. 2 will be smoothly sensed by the second sensing module 22b of the optical touch apparatus 2 of the invention. Then, please refer to FIG. 4(B) and FIG. 4(C). FIG. 4(B) and FIG. 4(C) illustrate the condition of the optical touch apparatus 2 sensing two touch points formed on the input interface 24 at the same time. As shown in FIG. 4(B), the touch point A2 is closer to the first sensing module 22a and the touch point B2 is closer to the second sensing module 22b; the distance d1 between the touch point A2 and the middle line M is equal to the distance d2 between the touch point B2 and the middle line M, namely d1=d2.

It should be noticed that although the relative positions of the touch points A2 and B2 will cause the condition that the second sensing module 22b fails to sense the signal S1 corresponding to the touch point A2, and the condition that the first sensing module 22a fails to sense the signal S2 corresponding to the touch point B2, the processing module 26 can still obtain a sensing result that the strength of the signal S1=the strength of the signal S2>the known signal strength according to the signal S1 corresponding to the touch point A2 sensed by the first sensing module 22a, the signal S2 corresponding to the touch point B2 sensed by the second sensing module 22b, and the known signal strength when the touch point is located at the middle line M, and the processing module 26 can determine two touch points A2 and B2 formed on the input interface 24 at the same time according to the above-mentioned sensing result, and d1=d2.

In practical applications, because the objects forming the above-mentioned touch points may have different sizes, therefore, the sizes of the touch points may be also different, and the optical touch apparatus may determine wrong touch point positions. In order to solve this problem, as shown in FIG. 4(B), the object can be disposed on a reference point R to form a reference touch point for correction. The reference point R can be located at the middle line M, but not limited by this case. Since the reference distances from the reference touch point to the first sensing module 22a and the second sensing module 22b are already known, if the lights emitted to the first sensing module 22a are blocked by the object and the size of the sheltered region formed at the opposite side is D1, and the lights emitted to the first sensing module 22a are blocked by the object located at the touch point A2 and the size of the sheltered region formed at the opposite side is D2, at this time, the processing module 26 can calculate the distance from the touch point A2 to the first sensing module 22a according to D1, D2, and the known reference distance, and then accordingly obtain the coordinate position of the touch point A2.

Similarly, as shown in FIG. 4(C), the processing module 26 can obtain the sensing result that the strength of the signal S1>the strength of the signal S2>the known signal strength, and accordingly determine that two touch points A2 and B2 are formed on the input interface 24 at the same time, and d1>d2.

Then, please refer to FIG. 5(A) through FIG. 5(C). FIG. 5(A)~FIG. 5(C) illustrate different conditions of the optical touch apparatus 2 sensing three touch points formed on the input interface 24 at the same time respectively. As shown in FIG. 5(A), $L_c$ is a central connecting line connected between the center of the first sensing module 22a and the center of the second sensing module 22b, and three touch points A2, P', and B2 are formed at the central connecting line $L_c$ connected between the center of the first sensing module 22a and the center of the second sensing module 22b at the same time. Since the touch point P' is located between the touch points A2 and B2, the first sensing module 22a can only sense the signal S1 corresponding to the touch point A2, and the second sensing module 22b can only sense the signal S2 corresponding to the touch point B2, therefore, the signal S3 corresponding to the touch point P' cannot be sensed by the first sensing module 22a or the second sensing module 22b.

Regarding to the condition of three touch points shown in FIGS. 5(B) and FIG. 5(C), although the three touch points A2, P', and B2 are formed at the same line, they are not formed at the central connecting line $L_c$ connected between the center of the first sensing module 22a and the center of the second sensing module 22b, therefore, they can still be sensed by the first sensing module 22a or the center of the second sensing module 22b. Wherein, the second sensing module 22b in FIG. 5(C) is not directly disposed toward the first sensing module 22a but shifted rightward, so that the central connecting line $L_c$ connected between the center of the first sensing module 22a and the center of the second sensing module 22b is also tiled accordingly.

Please refer to FIG. 6(A) and FIG. 6(B). FIG. 6(A) and FIG. 6(B) illustrate the corresponding relationship between the number of touch points formed at the same time and the number of sensing modules. As shown in FIG. 6(A), if there are four touch points P1~P4 formed at the same time, and the first sensing module 22a can only sense the touch points P2 and P3 and the second sensing module 22b can only sense the touch points P1 and P3, that is to say, the touch point P4 will not be sensed by the first sensing module 22a and the second sensing module 22b.

As shown in FIG. 6(B), even a third sensing module 22c is further disposed on the right side of the input interface 24 of the optical touch apparatus 2, the third sensing module 22c still fails to sense the touch point P4, therefore, increasing the number of the sensing modules does not assure that all touch points formed on the input interface 24 can be sensed at the same time.

Therefore, a determining rule for the multiple touch points can be concluded: when N touch points (N☐2) are formed on the input interface 24 of the optical touch apparatus 2 at the same time, M sensing lines are formed between the N touch points and the sensing modules. If N=M, the N touch points can be sensed by a single sensing module under a acceptable resolution condition; if N>M, even N=2, namely only two touch points formed on the input interface 24 at the same time, the single sensing module still fails to sense the two touch points at the same time. Although the number of the sensing modules can be increased to solve this problem, the determination failure conditions as shown in FIG. 6(A) and FIG. 6(B) can still occur due to the relative relationship between the positions of the sensing modules and the positions of the touch points.

Therefore, the main feature of the invention is to correspondingly dispose at least one functional input key on suitable position of the input interface 24 according to the different positions of the sensing modules disposed on the optical touch apparatus 2 to prevent the condition of N>M. It should be noticed that the at least one functional input key can be disposed on the input interface in a type of hardware or shown on the input interface in a way of displaying by software, there is no limitation to the at least one functional input key.

For example, as shown in FIG. 7(A), two functional input keys K1 and K2 which can be pushed at the same time are disposed on the central connecting line $L_{c1}$ between the sensing modules. And, the above-mentioned determining rule can be used to dispose functional input keys on the sensing region out of the central connecting line $L_{c1}$ to prevent the condition N>M. For example, in FIG. 7(A), the functional input keys K3~K5 are disposed on the insensible region and the functional input keys K6~K8 are disposed on the sensible region.

In addition, FIG. 7(B) shows the central connecting line $L_{c2}$ of the sensing modules is tiled rightward due to the position of the sensing modules. As shown in FIG. 7(B), the functional input keys K9 and K10 are disposed at the central connecting line $L_{c2}$; in fact, there is no limitation to the number of the functional input keys disposed at the central connecting line $L_{c2}$.

Figure 8A:
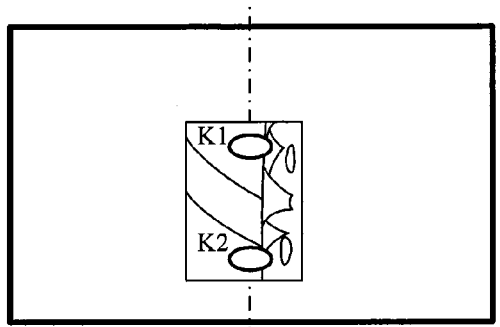

Then, the practical application conditions of the functional input keys disposed on the input interface of the optical touch apparatus in the invention will be introduced. As shown in FIG. 8(A), if an image is displayed on the touch monitor and the position of the image is on the functional input keys K1 and K2 disposed at the central connecting line between the sensing modules, the user can touch the functional input keys K1 and K2 to edit the image.

Figure 8B:
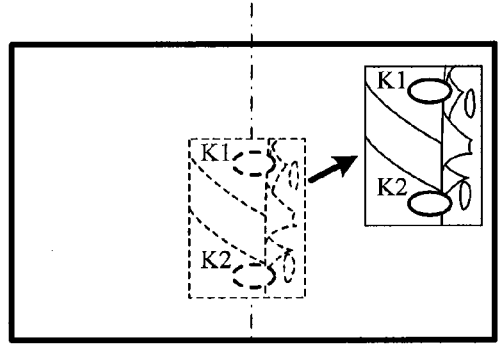
Figure 8C:
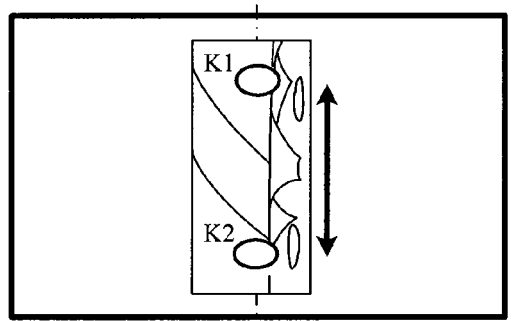
Figure 8D:
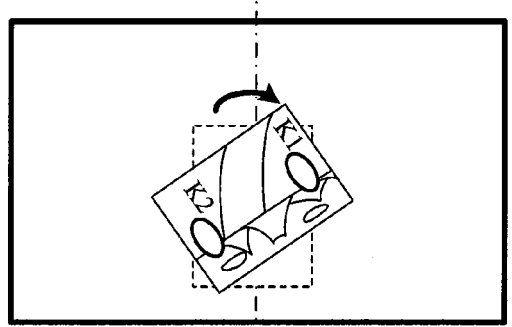

For example, once the user touches the functional input keys K1 and K2 shown in FIG. 8(A) and moves them toward upper-right direction, the image shown on the touch monitor will be moved accordingly, as shown in FIG. 8(B); if the user pushes the functional input keys K1 and K2 shown in FIG. 8(A) and moves them to the top and to the bottom respectively, the image shown on the touch monitor will be stretched up and down, as shown in FIG. 8(C); if the user pushes the functional input keys K1 and K2 shown in FIG. 8(A) and rotates them an angle rightward, the image shown on the touch monitor will also rotate the angle rightward, as shown in FIG. 8(D).

Figure 9A:
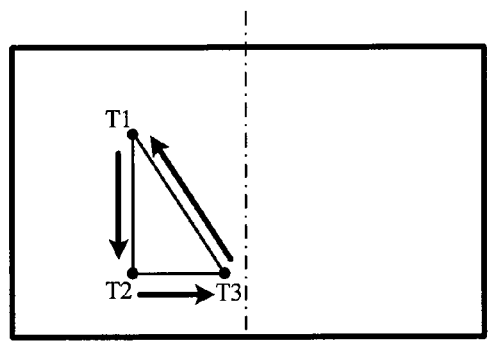

Please refer to FIG. 9(A) through FIG. 9(E). FIG. 9(A)~FIG. 9(E) illustrate another example of using the functional input key to perform the diagram editing function. As shown in FIG. 9(A), the user can touch the touch monitor to form a triangle on the touch monitor in an order of T1→T2→T3→T1.

Figure 9B:
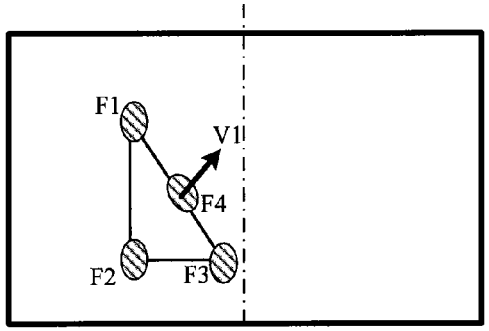

If the user wants to adjust the triangle shown in FIG. 9(A) to be a rectangle, as shown in FIG. 9(B), the user can push three vertices and edges of the triangle to form four touch points F1~F4 at the same time. Then, the user can push the touch point F4 and move to F4' in a direction of V1, and the triangle originally shown on the touch monitor will be changed to the rectangle shown in FIG. 9(C).

Figure 9D:
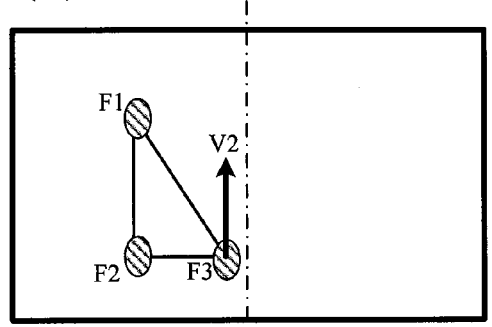
Figure 9C:
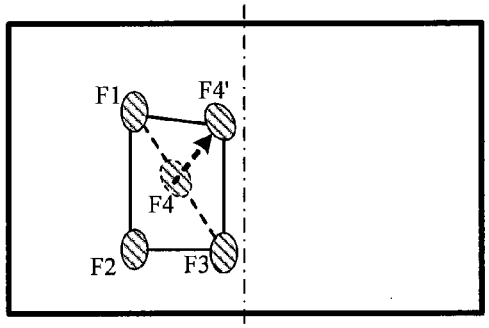
Figure 9E:
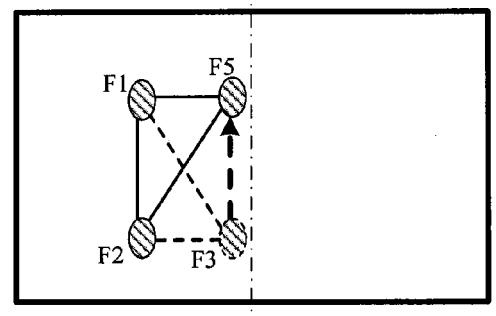

In addition, if the user wants to flip the triangle shown in FIG. 9(A) up and down, as shown in FIG. 9(D), the user can push the three vertices of the triangle to form three touch points F1~F3, and then push the touch point F3 and move to F5 in a direction of V2, then the triangle currently displayed on the touch monitor is the result of flipping the triangle originally shown in FIG. 9(A) up and down, as shown in FIG. 9(E).

A second embodiment of the invention is an optical touch apparatus operating method. In this embodiment, the optical touch apparatus includes an input interface, at least one sensing module, and a processing module. As shown in FIG. 10, at first, the step S10 is performed to dispose the at least one sensing module around the input interface. In fact, he at least one sensing module is movably disposed around the input interface, but the invention is not limited by this case.

Then, the step S12 is performed to dispose at least one functional input key on the input interface to make the position of the at least one functional input key disposed on the input interface corresponding to the position of the at least one sensing module disposed around the input interface. Afterward, in the step S14, the at least one sensing module generates a sensing result according to the condition of receiving the sensing lights. At last, in step S16, the processing module determines a touch point position formed on the input interface according to the sensing result.

In practical applications, if N touch points are formed on the input interface at the same time, and M lines are formed between the N touch points and the at least one sensing module, the corresponding relationship between the position of the at least one functional input key disposed on the input interface and the position of the at least one sensing module disposed around the input interface makes N smaller than or equal to M, wherein M and N are positive integers and N is larger than or equal to 2.

For example, if the at least one sensing module includes a first sensing module and a second sensing module, and the first sensing module and the second sensing module are disposed at a first position and a second position around the input interface, and the at least one functional input key is disposed at the central connecting line between the first sensing module and the second sensing module. In fact, the optical touch apparatus can include one or more sensing modules, and the number of the sensing modules is not limited by two in this case.

In practical applications, the at least one functional input key can be disposed on the input interface in a type of hardware (e.g., the real keys) or shown on the input interface in a way of displaying by software (e.g., the virtual keys displayed on the monitor), there is no limitation to the at least one functional input key.

Compared to the prior arts, the optical touch apparatus and operating method thereof of the invention can correspondingly practice the at least one functional input key at suitable positions of the input interface in a software way or a hardware way according to the different positions of the sensing modules, so that the condition of touch point determination failure caused when the number N of the touch points formed on the input interface at the same time is larger than the number M of the lines formed between the touch points and the at least one sensing module. Therefore, the efficiency of the optical touch apparatus for determining the multiple touch points can be effectively enhanced, so that the user can feel more convenient and humanizing when he/she operates the optical touch apparatus.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:
1. An optical touch apparatus, comprising:
an input interface comprising at least one functional input key;
at least one sensing module, disposed around the input interface, for receiving sensing lights and generating a sensing result according to the condition of receiving the sensing lights; and a processing module, coupled to the at least one sensing module, for determining a touch point position formed on the input interface according to the sensing result;

wherein the position of the at least one functional input key disposed on the input interface corresponds to the position of the at least one sensing module disposed around the input interface, if N touch points are formed on the input interface at the same time, and M lines are formed between the N touch points and the at least one sensing module, the corresponding relationship between the position of the at least one functional input key disposed on the input interface and the position of the at least one sensing module disposed around the input interface makes N smaller than or equal to M, wherein M and N are positive integers and N is larger than or equal to 2, and the at least one functional input key is correspondingly disposed on suitable position of the input interface according to the position of the at least one sensing module disposed around the input interface to prevent the condition that N is larger than M.

2. The optical touch apparatus of claim 1, wherein the at least one functional input key is disposed on the input interface in a type of hardware.

3. The optical touch apparatus of claim 1, wherein the at least one functional input key is shown on the input interface in a way of displaying by software.

4. The optical touch apparatus of claim 1, wherein the at least one sensing module comprises a first sensing module and a second sensing module, and the first sensing module and the second sensing module are disposed on different positions around the input interface respectively.

5. The optical touch apparatus of claim 4, wherein the at least one functional input key is disposed at a line of connecting centers of the first sensing module and the second sensing module.

6. The optical touch apparatus of claim 1, wherein the at least one functional input key is disposed at a line of connecting centers of the at least one sensing module.

7. The optical touch apparatus of claim 1, wherein the at least one sensing module is movably disposed around the input interface.

8. A method of operating an optical touch apparatus, the optical touch apparatus comprising an input interface, at least one sensing module, and a processing module, the method comprising steps of:

(a) disposing the at least one sensing module around the input interface;

(b) disposing at least one functional input key on the input interface to make the position of the at least one functional input key disposed on the input interface corresponding to the position of the at least one sensing module disposed around the input interface;

(c) the at least one sensing module generating a sensing result according to the condition of receiving the sensing lights; and (d) the processing module determining a touch point position formed on the input interface according to the sensing result;

wherein if N touch points are formed on the input interface at the same time, and M lines are formed between the N touch points and the at least one sensing module, the corresponding relationship between the position of the at least one functional input key disposed on the input interface and the position of the at least one sensing module disposed around the input interface makes N smaller than or equal to M, wherein M and N are positive integers and N is larger than or equal to 2, and the at least one functional input key is correspondingly disposed on suitable position of the input interface according to the position of the at least one sensing module disposed around the input interface to prevent the condition that N is larger than M.

9. The method of claim 8, wherein the at least one functional input key is disposed on the input interface in a type of hardware.

10. The method of claim 8, wherein the at least one functional input key is shown on the input interface in a way of displaying by software.

11. The method of claim 8, wherein the at least one sensing module comprises a first sensing module and a second sensing module, and the first sensing module and the second sensing module are disposed on different positions around the input interface respectively.

12. The method of claim 11, wherein the step (b) is to dispose the at least one functional input key at a line of connecting centers of the first sensing module and the second sensing module.

13. The method of claim 8, wherein the step (b) is to dispose the at least one functional input key at a line of connecting centers of the at least one sensing module.

14. The method of claim 8, wherein the step (a) is to movably dispose the at least one sensing module around the input interface.

* * * * *